United States Patent
Gandiga

(10) Patent No.: US 11,049,406 B2
(45) Date of Patent: Jun. 29, 2021

(54) THERMAL IMAGE BASED PRECISION DRONE LANDING SYSTEMS AND METHODS

(71) Applicant: Ford Global Technologies, LLC, Dearborn, MI (US)

(72) Inventor: Sandeep Raj Gandiga, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 16/226,064

(22) Filed: Dec. 19, 2018

(65) Prior Publication Data
US 2020/0202727 A1   Jun. 25, 2020

(51) Int. Cl.
| | |
|---|---|
| G08G 5/02 | (2006.01) |
| G08G 5/00 | (2006.01) |
| B64D 45/08 | (2006.01) |
| B64C 39/02 | (2006.01) |
| G05D 1/10 | (2006.01) |

(52) U.S. Cl.
CPC ........... *G08G 5/025* (2013.01); *B64C 39/024* (2013.01); *B64D 45/08* (2013.01); *G05D 1/101* (2013.01); *G08G 5/0069* (2013.01); *B64C 2201/127* (2013.01); *B64C 2201/208* (2013.01)

(58) Field of Classification Search
CPC .... G08G 5/025; G08G 5/0069; B64C 39/024; B64C 2201/127; B64C 2201/208; B64D 45/08; G05D 1/101
See application file for complete search history.

(56) References Cited

U.S. PATENT DOCUMENTS

| | | |
|---|---|---|
| 2015/0051758 A1 | 2/2015 | Cho |
| 2016/0039542 A1* | 2/2016 | Wang ........................ B64F 1/20 701/2 |

FOREIGN PATENT DOCUMENTS

KR   20170004508 A   1/2017

OTHER PUBLICATIONS

Fu, et al., "Autonomous Landing of a Quadrotor on an UGV," 2016 IEEE International Conference on Mechatronics and Automation, Harbin, 2016, pp. 988-993. doi: 10.1109/ICMA.2016.7558697.
Khithov, et al., "Towards Autonomous UAV Landing Based on Infrared Beacons and Particle Filtering," in Proceedings of the 4th International Conference on Robot Intelligence Technology and Applications (RiTA 2015), Bucheon, Korea, Dec. 14-16, 2015. pp. 529-537. Springer International Publishing.
Kong, et al., "Autonomous Landing of an UAV with a Ground-Based Actuated Infrared Stereo Vision System," 2013 IEEE/RSJ International Conference on Intelligent Robots and Systems, Tokyo, 2013, pp. 2963-2970. doi: 10.1109/IROS.2013.6696776.

* cited by examiner

*Primary Examiner* — Michael D Lang
(74) *Attorney, Agent, or Firm* — Brandon Hicks; Eversheds Sutherland (US) LLP

(57) ABSTRACT

Thermal image based precision drone landing systems and methods are disclosed herein. An example system can include a landing surface for receiving an unmanned aerial vehicle, a heat-based guidance assembly comprising a plurality of heat emitting units, and a controller that controls operation of the plurality of heat emitting units to create a pattern that is recognized by the unmanned aerial vehicle and guides the unmanned aerial vehicle in landing on the landing surface.

16 Claims, 4 Drawing Sheets

THERMAL IMAGE BASED PRECISION DRONE LANDING SYSTEMS AND METHODS

FIELD OF THE DISCLOSURE

The disclosure generally relates to unmanned aerial vehicles (UAVs), and more specifically, but not by way of limitation, to systems and methods that allow for precision landing of drones using pattern creating, heat emitting assemblies as well as thermal imaging systems used by UAVs to read and interpret heat patterns for purposes of navigation and landing. In some instances, these systems and methods allow for precision landing of a UAV when landing platforms and surfaces are mobile.

BACKGROUND

UAV operation and utilization, such as launching, can be performed from vehicles or other mobile platforms, and is enabled through integration of software and hardware. Conversely precision landing of UAVs, and specifically landing on mobile platforms, remains elusive. Autonomous precision landing of an UAV on a vehicle or on any landing area is technically challenging.

Systems and methods currently exist that assist in landing of drones, but they have corresponding disadvantages. For example, some UAVs operate in a tethered manner. A wire/cable is attached to a gimbal of the UAV and guides the UAV to the landing area. The limitation here is that this mechanical solution works with tethered drones. In other embodiments, when the UAV is being launched, the UAV's camera captures a launching area scene and uses it to pattern match while landing later. The limitation here is that the pattern capture is static and cannot be used when the landing area is moved to a different location, such as when the landing platform is moved. Also, this particular method is not effective in instances where visual apprehension of the landing area is obscured such as in limited light, fog, at night, and so forth. Thus, a need exists for systems and methods that remedy these drawbacks and allow for precision landing of UAVs.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure presents systems and methods that enable precision landing of UAVs, and in some instances landing of UAVs on a mobile landing platform such as a vehicle or a naval vessel. In general, the systems and methods provide a landing surface that is enabled with a heat-based pattern generation capability (referred to generally as a heat-based guidance assembly). The heat-based guidance assembly can direct the UAV onto the landing surface in inclement weather such as any weather condition that would impair or obscure the ability of the UAV to visually apprehend the landing surface. In some embodiments, the UAV is provided with general location and position data for the landing surface such as GPS data. This GPS data allows the UAV to locate a general vicinity of the landing surface.

When the UAV is in proximity to the landing surface, a message can be transmitted to the UAV that includes a heat-based pattern that is being emitted by the heat-based guidance assembly. In some embodiments, the UAV is pre-programmed with a unique pattern instead of receiving this data during flight. The heat-based patterns can comprise any geometrical configuration, and the size, shape, and/or composition of a pattern can be selectively varied to communicate information to the UAV such as the relative distance between the UAV and the landing surface. These and other advantages of the present disclosure are provided in greater detail herein with reference to the collective drawings.

Illustrative Architecture

Figure 1:
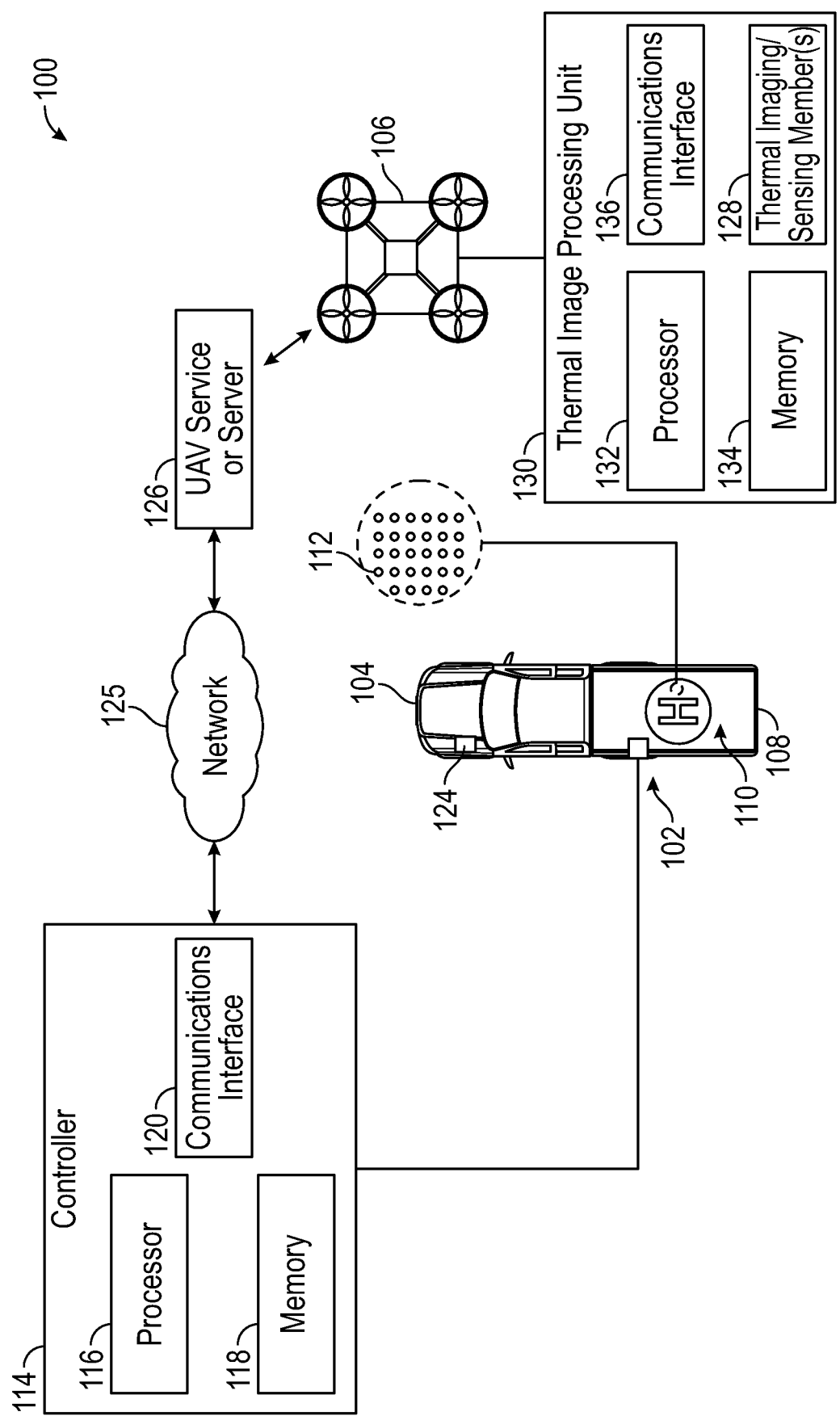
FIG. 1 depicts a generalized environment for practicing aspects of the present disclosure.

Turning now to the drawings, FIG. 1 depicts an illustrative architecture 100 in which techniques and structures for providing the systems and methods disclosed herein may be implemented. The architecture 100 generally comprises a mobile UAV landing platform assembly 102 associated with a vehicle 104 and a UAV 106 that is specifically configured to land on the mobile UAV landing platform assembly 102 in accordance with aspects of the present disclosure.

In some embodiments, the UAV landing platform assembly 102 comprises a landing surface 108 that is associated with a portion of the vehicle 104. In one embodiment, the vehicle 104 comprises a truck, and the landing surface 108 is a horizontal platform disposed in a bed of the truck. To be sure, this is merely an example embodiment of a configuration that is suitable for practicing aspects of the present disclosure. That is, the UAV landing platform assembly 102 can be associated with any mobile substructure or substrate. Also, while the embodiments disclosed herein are advantageous in the context of mobile environments, the UAV landing platform assembly 102 and its heat-based pattern generation capabilities are suitable for use in static/fixed environments as well, such as a UAV landing area in an airport.

In various embodiments, the UAV landing platform assembly 102 comprises a heat-based guidance assembly 110. The heat-based guidance assembly 110 comprises generally a plurality of heat emitting units such as a heat emitting unit 112. The plurality of heat emitting units can be arranged onto a substrate in any predetermined pattern on or near the landing surface 108. In some embodiments, the plurality of heat emitting units are located within a perimeter of the landing surface 108. In various embodiments, the plurality of heat emitting units are arranged into a grid or matrix allowing for the creation of many types of patterns as will be discussed in greater detail infra. A portion of a grid of heat emitting units is illustrated in a close-up view provided in FIG. 1 that includes the example heat emitting unit 112.

The plurality of heat emitting units are used to create a unique pattern which can be detected and recognized by the UAV 106 for navigation and landing of the UAV 106. In some embodiments, the plurality of heat emitting units are operated through use of a controller 114. The controller 114 generally comprises a processor 116 and a memory 118. The memory 118 stores logic for navigating the UAV 106 as well as identifying pattern(s) that can be used by the UAV 106 during landing operations. In some embodiments, the processor 116 is configured to execute the instructions to receive and navigate the UAV 106 to a general vicinity of the landing surface 108 based on messages received from the UAV landing platform assembly 102. In some embodiments, the UAV landing platform assembly 102 comprises a communications interface 120 used to communicate with the UAV 106 either directly or indirectly through a UAV service or server 126 over a network 125.

In some embodiments, the UAV landing platform assembly 102 communicates with the UAV 106 over the network 125. In certain embodiments, the controller 114 transmits data to the UAV 106 such as location-based data regarding the location or position of the landing surface 108. In some embodiments, the UAV landing platform assembly 102 can also transmit pattern-related data to the UAV 106. For example, rather than being pre-provisioned with pattern information, the UAV landing platform assembly 102 transmits a pattern to the UAV 106 during flight. The pattern illustrated in FIG. 1 is an H surrounded by a circle that is indicative of a traditional helipad landing symbol. These patterns are created through selective control of the heat emitting units. This is merely an example of a heat-based pattern and is not intended to be limiting.

In general, the UAV 106 can read and interpret the pattern, as well as use the pattern as a means for sensing a precise location of the landing surface 108. The UAV 106 can center itself on the pattern during landing. The pattern can also be used as a means for the UAV 106 to differentiate between multiple landing areas that may be in the same vicinity as the landing surface 108. That is, the UAV 106 will land on the landing surface 108 only when the heat-based pattern being emitted by the heat-based guidance assembly 110 of the UAV landing platform assembly 102 matches the pattern recognized by the UAV 106. Again, this pattern can include a pattern provided in real-time by the UAV landing platform assembly 102 or can include a pre-provisioned pattern stored by the UAV 106. In some instances, the UAV 106 can store in memory 118 an index of acceptable patterns which allow the UAV landing platform assembly 102 to cycle through patterns if desired. This also allows the UAV 106 to recognize multiple authorized landing surfaces, where each of the landing surfaces is associated with its own unique heat-based pattern.

In some embodiments, each of the patterns is linked to a pattern identifier. The UAV landing platform assembly 102 can transmit to the UAV 106 a pattern identifier of a pattern that will be displayed by the heat-based guidance assembly 110. The UAV 106 can look up an associated pattern in its list of patterns using the pattern identifier. This pattern uniqueness also allows the UAV landing platform assembly 102 to be used with multiple UAVs.

According to some embodiments, the control and communications disclosed above as being performed by the UAV landing platform assembly 102 can also be performed by a vehicle controller 124 of the vehicle 104. For example, an in-vehicle computer or human machine interface, such as Sync™, can dynamically select, update, or provision a heat-based pattern for a landing surface 108 and transmit the heat-based pattern to the UAV 106.

Figure 2A:
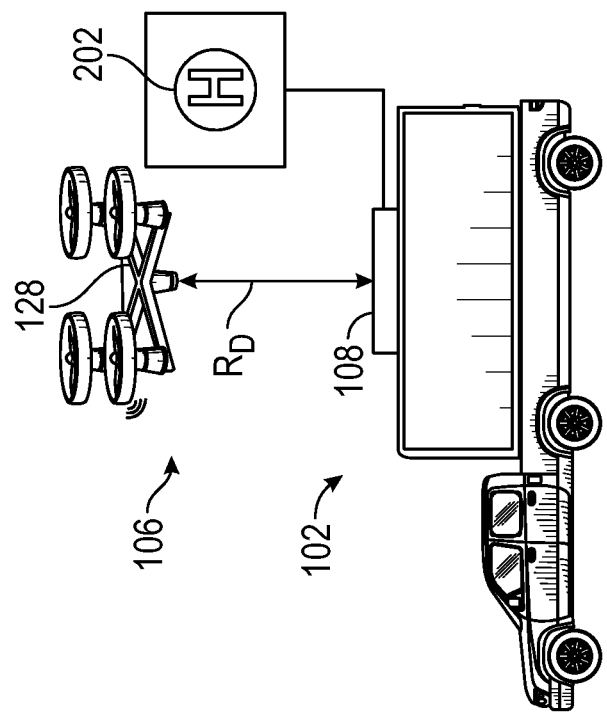
FIGS. 2A and 2B illustrate example use cases of relative distance communication during a landing operation of a UAV with a UAV landing platform assembly of the present disclosure.
Figure 2B:
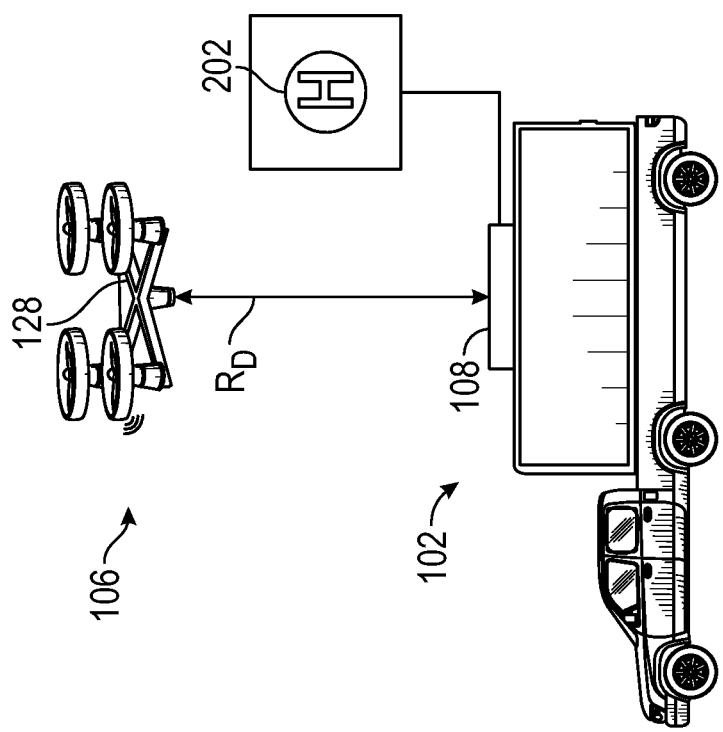

This pattern data can be transmitted along with the GPS location of the landing/pattern area. As is best illustrated in FIGS. 2A and 2B, the vehicle controller 124 can also transmit a relative distance between the landing surface 108 and the UAV 106 while the UAV 106 is approaching the landing surface 108. Thus, the control and communications of the UAV landing platform assembly 102 can be consolidated within the UAV landing platform assembly 102 as a stand-alone system. In other instances, the control and communications of the UAV landing platform assembly 102 are performed in part or in whole by the vehicle controller 124 into which the UAV landing platform assembly 102 is integrated.

The devices/systems of the present disclosure can utilize a network for communication. The network 125 may include any one or a combination of multiple different types of networks, such as cable networks, the Internet, wireless networks, and other private and/or public networks. In some instances, the network 125 may include Bluetooth, cellular, near-field communication (NFC), Wi-Fi, or Wi-Fi direct. In some embodiments, the network 125 includes a device-to-device communication over a short range wireless connection. In some embodiments, the UAV landing platform assembly 102 and the UAV 106 can communicate with one another entirely using only heat-based pattern mediated communications.

In some embodiments, the landing surface 108 can be composed of any suitable material, metal, alloy, plastic, glass, or combinations thereof. In some embodiments, combinations of materials are used with a portion of these materials having different intrinsic thermal capabilities to passively generate a heat-based pattern with and/or without external heating. For example, structural aspects of the landing surface 108 can be created from a metal, and heat-based pattern emitting materials are used to create a design such as that illustrated in FIG. 1. The heat-based pattern emitting materials used to create the circle and H design comprise any material that is capable of absorbing thermal energy from sunlight during the day and emitting the stored thermal energy at night.

In some embodiments, the heat-based pattern emitting materials can act passively, releasing and storing thermal energy as discussed. In other embodiments, the heat-based pattern emitting materials can also be driven to emit thermal energy and are operated by a controller that supplies electrical energy to the heat-based pattern emitting materials to cause them to emit the heat-based pattern. Application of a current to the heat-based pattern emitting materials causes them to radiate thermal energy.

In combination, the present disclosure contemplates a landing area with a heat-based pattern generation capability that is capable of being sensed by a specifically configured UAV 106 that is configured to utilize thermal sensing and imaging. The UAV 106 can read a heat-based pattern generated by the heat-based guidance assembly 110 using the plurality of heat emitting units. In certain embodiments, the heat-based pattern is unique to the UAV 106.

In various embodiments, the controller 114 of the UAV landing platform assembly 102 can be configured to selectively vary attributes or parameters of the heat emitting units used to produce the heat-based pattern that is sensed by the UAV 106. In some embodiments, the controller 114 of the UAV landing platform assembly 102 is configured to selectively alter at least one of the pattern shape, size, and/or heat intensity of the heat emitting units based on the weather and surroundings of the landing area. For example, the controller 114 can selectively vary heat intensity when the ambient temperature around the landing surface 108 changes. When the ambient temperature decreases, the heat intensity can be decreased.

Referring now to FIGS. 1, 2A, and 2B collectively, the controller 114 can selectively vary a shape or size of the pattern produced by the heat emitting units to communicate information to the UAV 106. For example, if the heat-based pattern includes a symbol, the size of the symbol can be increased or decreased based on a relative distance $R_D$ between the UAV 106 and the landing surface 108. The greater the relative distance $R_D$ the larger a size of the symbol. As this relative distance $R_D$ is decreased, the symbol is reduced in size in a proportional manner. The UAV 106 can be configured to calculate the relative distance $R_D$ or in other embodiments the UAV landing platform assembly 102 can calculate this value and provide it on a continual basis to the UAV 106. FIGS. 2A and 2B collectively illustrate this communication between the UAV landing platform assembly 102 and the UAV 106 when closing the relative distance $R_D$ during landing of the UAV 106 on the landing surface 108. The communication occurs, in part, through a change in the relative size of a pattern 202. This view also illustrates a thermal sensing member 128, such as a camera that is downwardly oriented to capture thermal images of the landing surface 108. As noted herein, rather than changing a size or shape of the pattern 202, a heat-intensity of the pattern 202 could be changed to indicate the change in relative distance $R_D$.

Referring back to FIG. 1, the following descriptions provide additional detail with regard to the structural and functional configurations of the UAV 106. In some embodiments, the UAV 106 can include infrared (IR), thermal, or other similar components (generally referred to as the thermal sensing member(s) 128 or thermal sensing means). In one embodiment, the thermal sensing member(s) 128 comprise a thermal signature sensing camera to detect the heat-based pattern being emitted by the heat-based guidance assembly 110 associated with the landing surface 108. This is accomplished using a thermal image processing unit 130. The thermal image processing unit 130 can generally comprise a processor 132 and a memory 134. The memory 134 stores instructions that allow the processor 132 to analyze and process the thermal images captured by the thermal sensing member(s) 128. The thermal image processing unit 130 also can comprise a communications interface 136 that allows the UAV 106 to communicatively connect to the network 125. In some instances, in the case of a user setting the heat pattern, the thermal image processing unit 130 can send the thermal image to the controller 114 of the UAV landing platform assembly 102 and request a confirmation if the captured thermal image pattern is the correct one. The image can be displayed on the in-vehicle screen and the user can input the confirmation from the vehicle human-machine-interface (HMI) via touch or voice. Also, the user can mark the landing area in the picture on the HMI, which can be sent back to the UAV 106. The UAV 106 can then focus on the marked area. Additionally, the user can mark the landing area on the live video stream being displayed on the HMI screen (instead of the image sent from the UAV 106).

This heat-based pattern on or near the landing surface aids the UAV 106 in landing even when the landing surface 108 is moving. The thermal sensing member(s) 128 can generate thermal images covering the landing area pattern, and the images can be processed to identify the landing area location. The UAV 106 can operate by centering itself on the heat-based pattern in the thermal image.

In sum, the UAV 106 is configured to locate a general vicinity of a mobile landing platform using location signals from the mobile landing platform. The UAV 106 is also configured to sense a heat-based pattern generated by the plurality of heat emitting units of the mobile landing platform, and further to cause the UAV to land on the landing surface 108 of the mobile landing platform when the pattern matches a stored pattern in the memory. Again, this can include patterns that are stored temporarily in cache (such as when the pattern is dynamically provisioned) or permanently in memory.

Figure 3A:
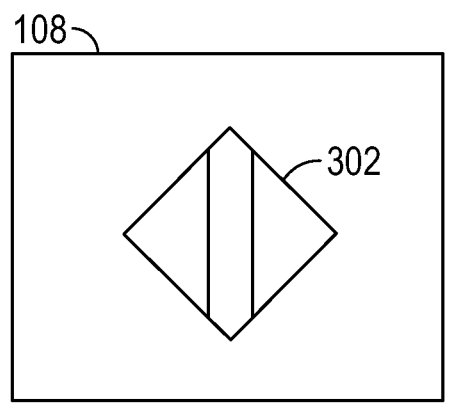
FIGS. 3A and 3B collectively and individually illustrate example heat-based patterns that can be used in accordance with the present disclosure.
Figure 3B:
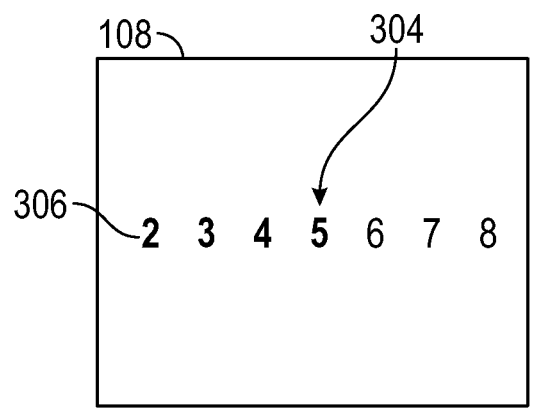

FIGS. 3A and 3B each individually illustrate example heat-based patterns that can be emitted by the heat-based guidance assembly. In FIGS. 3A and 3B, two example patterns are illustrated, one being a geometrical pattern 302 in FIG. 3A, and the other pattern 304 being alphanumeric characters as shown in FIG. 3B. As noted herein, the patterns are confined within a perimeter of the landing surface 108. In some embodiments, the heat-based guidance assembly is not integrated into the landing surface 108, but can be placed adjacently thereto.

Of note, the pattern 304 of FIG. 3B is illustrated to show only a portion of the alphanumeric characters being activated (emitting heat), with a remaining portion being inactive (not emitting heat). For example, thicker lined characters such as character 306 are active in this illustration. For purposes of illustration, characters 2, 3, 4, and 5 are active, whereas characters 6, 7, and 8 are inactive. This example is indicative of the selective variance of the pattern 304 that can be used to convey information to a UAV. For example, as the drone gets closer to the landing surface 108, additional ones of the alphanumeric characters are activated to emit heat. In an example use case, when the UAV is far from the landing surface 108 (far being relative and based on operating conditions), the controller can cumulatively generate and activate digits (or other characters), eventually covering the whole landing area with active characters until the UAV is near (within a specified distance) the landing surface 108, at which time all digits are activated so as to be visible at the same time.

The pattern 302 of FIG. 3A can also be varied in size to convey information to the UAV. In some embodiments, the pattern can be switched entirely. For example, alphanumeric characters can be replaced with a symbol. Thus, a pattern can be changed in a single landing sequence based on the need for a more visible large pattern when the UAV is too high or far from the landing surface 108. This pattern is replaced with an artistic, unique, or smaller pattern when near the landing surface 108.

Illustrative Methods and Operations

Figure 4:
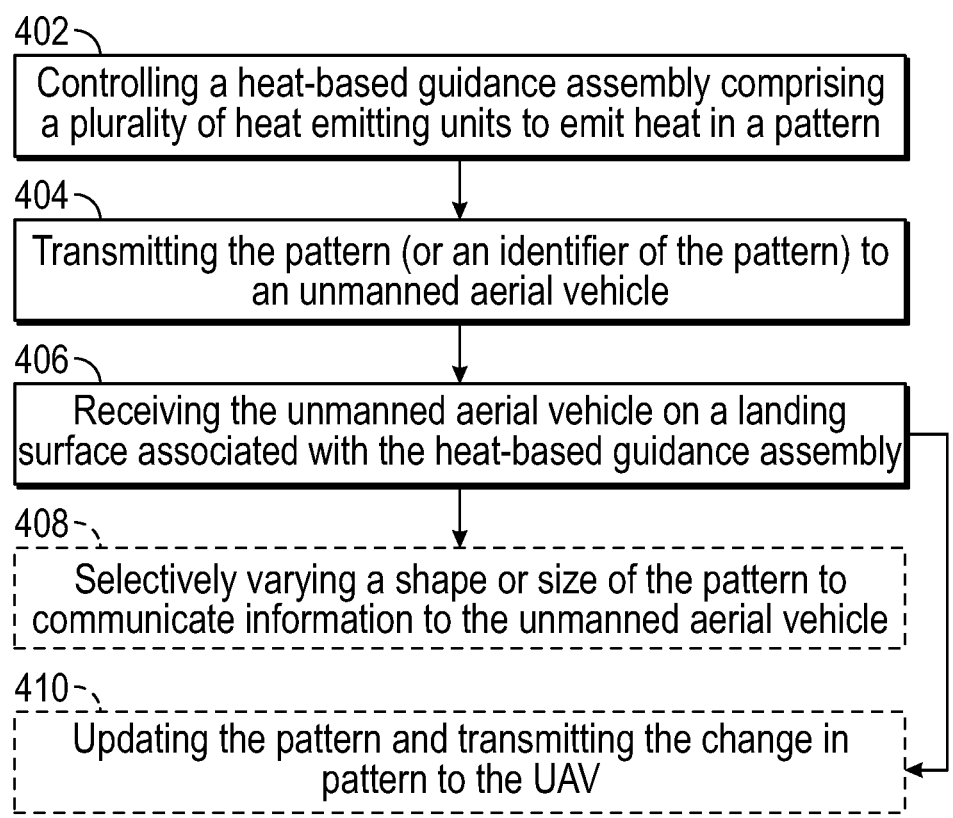
FIG. 4 is a flowchart of an example method of the present disclosure.

FIG. 4 is a flowchart of an example method of the present disclosure. The method is performed by the UAV landing platform assembly (such as the UAV landing platform assembly 102 of FIG. 1). In general, the method comprises a step 402 of controlling a heat-based guidance assembly comprising a plurality of heat emitting units to emit heat in a pattern. Next, the method includes a step 404 of transmitting the pattern (or an identifier of the pattern) to an unmanned aerial vehicle. The method also includes a step 406 of receiving the unmanned aerial vehicle on a landing surface associated with the heat-based guidance assembly.

In some embodiments, the method includes an optional step 408 of selectively varying a shape or size of the pattern to communicate information to the unmanned aerial vehicle.

Again, this can include information such as a relative distance, a change in the heat-based pattern for landing, GPS coordinates, and other similar data. In other embodiments, the method can include an optional step 410 of updating the pattern and transmitting the change in pattern to the UAV.

Example Embodiments

In some instances, the following examples may be implemented together or separately by the systems and methods described herein.

Example 1 may include a system, comprising: a landing surface for receiving an unmanned aerial vehicle; and a heat-based guidance assembly comprising a plurality of heat emitting units, wherein the heat-based guidance assembly is disposed about the landing surface; and a controller that controls operation of the plurality of heat emitting units to create a pattern that is recognized by the unmanned aerial vehicle and guides the unmanned aerial vehicle in landing on the landing surface.

Example 2 may include the system according to example 1, wherein the pattern is unique to the unmanned aerial vehicle.

Example 3 may include the system according to example 1 and/or some other example herein, wherein the heat-based guidance assembly is integrated within a perimeter of the landing surface.

Example 4 may include the system according to example 1 and/or some other example herein, wherein the controller is further configured to selectively vary the pattern for the unmanned aerial vehicle.

Example 5 may include the system according to example 4 and/or some other example herein, wherein the pattern is selectively varied to indicate a relative change in distance between the unmanned aerial vehicle and the landing surface.

Example 6 may include the system according to example 4 and/or some other example herein, wherein the pattern comprises at least one alphanumeric object.

Example 7 may include the system according to example 1 and/or some other example herein, wherein the pattern is updated based on a message received from a vehicle controller that is communicatively coupled with the controller of the system.

Example 8 may include the system according to example 7 and/or some other example herein, wherein the system is associated with a vehicle comprising the vehicle controller, the message further comprising GPS coordinates received from the vehicle controller that are indicative of a location of the landing surface.

Example 9 may include the system according to example 7 and/or some other example herein, wherein the controller is further configured to: receive the pattern from the vehicle controller; and compare the pattern with a pattern list or index that comprises authorized patterns, the controller authorizing the unmanned aerial vehicle for landing on the landing surface when a match is found.

Example 10 may include the system according to example 1 and/or some other example herein, wherein the controller is further configured to selectively vary a size of the pattern based on a distance measured between the landing surface and the unmanned aerial vehicle.

Example 11 may include a method, comprising: controlling a heat-based guidance assembly comprising a plurality of heat emitting units to emit heat in a pattern; transmitting the pattern to an unmanned aerial vehicle; and receiving the unmanned aerial vehicle on a landing surface associated with the heat-based guidance assembly.

Example 12 may include the method according to example 11, further comprising: utilizing a thermal sensing means to sense the pattern created by the plurality of heat emitting units; and navigating the unmanned aerial vehicle onto the landing surface based on the sensing of the pattern.

Example 13 may include the method according to example 11 and/or some other example herein, further comprising selectively varying a shape or a size of the pattern to communicate information to the unmanned aerial vehicle.

Example 14 may include the method according to example 13 and/or some other example herein, wherein the pattern is selectively varied to indicate a relative change in distance between the unmanned aerial vehicle and the landing surface.

Example 15 may include the method according to example 14 and/or some other example herein, further comprising updating the pattern based on a message received from a vehicle controller that is communicatively coupled with the controller.

Example 16 may include an unmanned aerial vehicle, comprising: a thermal sensing member; and at least one processor in communication with at least one memory, the at least one processor executing instructions stored in the at least one memory to: locate a general vicinity of a mobile landing platform using location signals from the mobile landing platform; sense a pattern generated by a plurality of heat emitting units of the mobile landing platform; and cause the unmanned aerial vehicle to land on a landing surface of the mobile landing platform when the pattern matches a stored pattern in the memory.

Example 17 may include the unmanned aerial vehicle according to example 16, wherein the at least one processor further executes the instructions to receive the stored pattern from the mobile landing platform, the mobile landing platform configured to communicate with a plurality of other unmanned aerial vehicles a unique pattern assigned to each of the plurality of other unmanned aerial vehicles.

Example 18 may include the unmanned aerial vehicle according to example 16 and/or some other example herein, wherein the at least one processor further executes the instructions to determine a distance between the landing surface and the unmanned aerial vehicle based on changes to the pattern.

Example 19 may include the unmanned aerial vehicle according to example 16 and/or some other example herein, wherein the location signals comprise GPS coordinates received from a vehicle controller of the mobile landing platform.

Example 20 may include the unmanned aerial vehicle according to example 16 and/or some other example herein, wherein the at least one processor further executes the instructions to determine a size or shape of the landing surface based on output of the plurality of heat emitting units.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
a landing surface for receiving an unmanned aerial vehicle;
a heat-based guidance assembly comprising a plurality of heat emitting units, wherein the heat-based guidance assembly is disposed about the landing surface; and
a controller that controls operation of the plurality of heat emitting units to create a pattern that is recognized by the unmanned aerial vehicle and guides the unmanned aerial vehicle in landing on the landing surface,
wherein the controller is further configured to selectively vary a size of the pattern based on a distance measured between the landing surface and the unmanned aerial vehicle.

2. The system according to claim 1, wherein the pattern is unique to the unmanned aerial vehicle.

3. The system according to claim 1, wherein the heat-based guidance assembly is integrated within a perimeter of the landing surface.

4. The system according to claim 1, wherein the controller is further configured to selectively vary the pattern for the unmanned aerial vehicle.

5. The system according to claim 4, wherein the pattern is selectively varied to indicate a relative change in distance between the unmanned aerial vehicle and the landing surface.

6. The system according to claim 4, wherein the pattern comprises at least one alphanumeric object.

7. The system according to claim 1, wherein the pattern is updated based on a message received from a vehicle controller that is communicatively coupled with the controller of the system.

8. The system according to claim 7, wherein the system is associated with a vehicle comprising the vehicle controller, the message further comprising GPS coordinates received from the vehicle controller that are indicative of a location of the landing surface.

9. The system according to claim 7, wherein the controller is further configured to:
receive the pattern from the vehicle controller; and
compare the pattern with a pattern list or index that comprises authorized patterns, the controller authorizing the unmanned aerial vehicle for landing on the landing surface when a match is found.

10. A method, comprising:
controlling a heat-based guidance assembly comprising a plurality of heat emitting units to emit heat in a pattern;
transmitting the pattern to an unmanned aerial vehicle;
receiving the unmanned aerial vehicle on a landing surface associated with the heat-based guidance assembly, and
selectively varying a shape or a size of the pattern to communicate information to the unmanned aerial vehicle,
wherein the pattern is selectively varied to indicate a relative change in distance between the unmanned aerial vehicle and the landing surface.

11. The method according to claim 10, further comprising:
utilizing a thermal sensing means to sense the pattern created by the plurality of heat emitting units; and
navigating the unmanned aerial vehicle onto the landing surface based on the sensing of the pattern.

12. The method according to claim 10, further comprising updating the pattern based on a message received from a vehicle controller that is communicatively coupled with the controller.

13. An unmanned aerial vehicle, comprising:
a thermal sensing member; and
at least one processor in communication with at least one memory, the at least one processor executing instructions stored in the at least one memory to:
locate a general vicinity of a mobile landing platform using location signals from the mobile landing platform;
sense a pattern generated by a plurality of heat emitting units of the mobile landing platform;
cause the unmanned aerial vehicle to land on a landing surface of the mobile landing platform when the pattern matches a stored pattern in the memory; and
determine a distance between the landing surface and the unmanned aerial vehicle based on changes to the pattern.

14. The unmanned aerial vehicle according to claim 13, wherein the at least one processor further executes the instructions to receive the stored pattern from the mobile landing platform, the mobile landing platform configured to communicate with a plurality of other unmanned aerial vehicles a unique pattern assigned to each of the plurality of other unmanned aerial vehicles.

15. The unmanned aerial vehicle according to claim 13, wherein the location signals comprise GPS coordinates received from a vehicle controller of the mobile landing platform.

16. The unmanned aerial vehicle according to claim 13, wherein the at least one processor further executes the instructions to determine a size or shape of the landing surface based on output of the plurality of heat emitting units.

* * * * *